Patented Nov. 15, 1927.

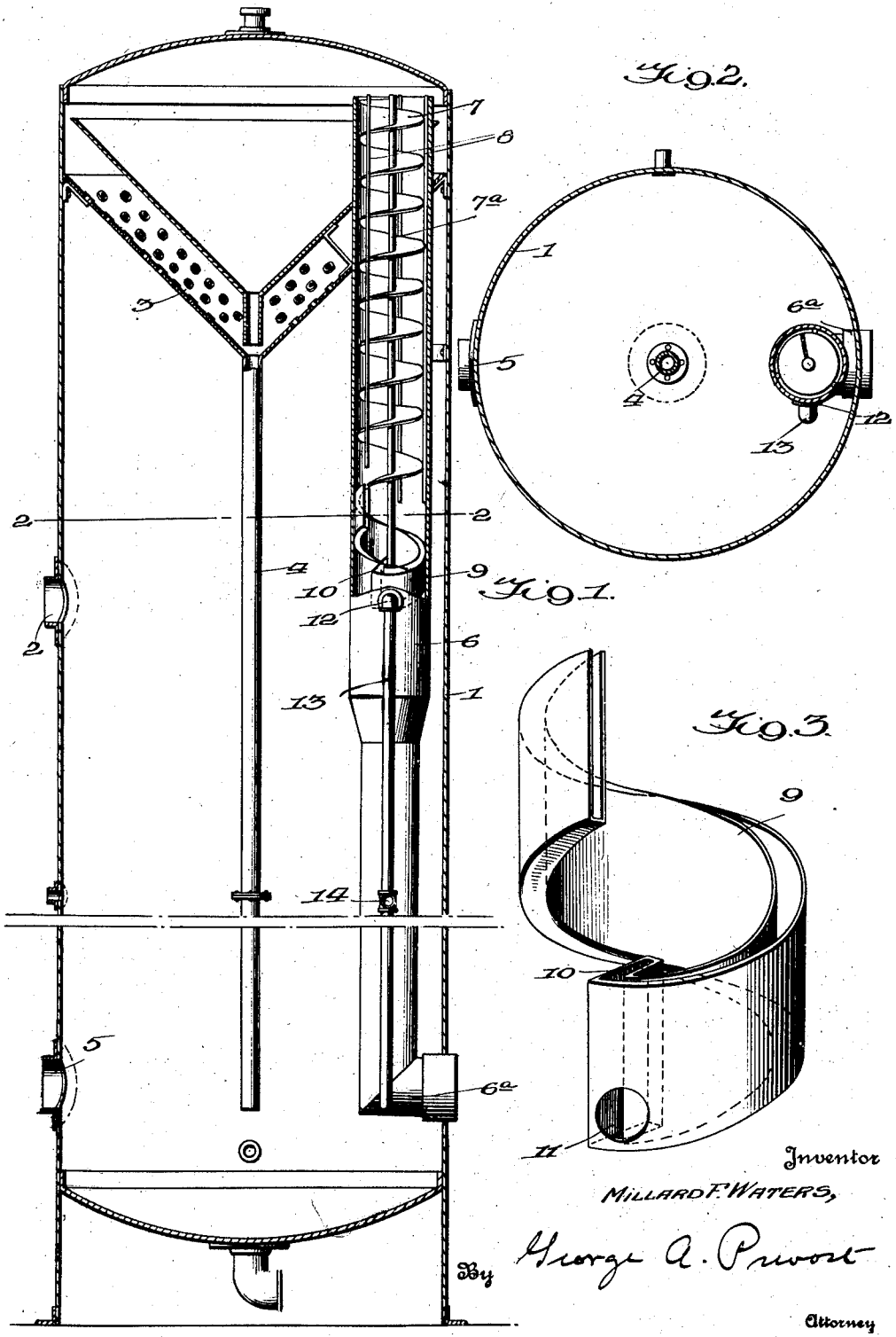

1,649,556

UNITED STATES PATENT OFFICE.

MILLARD F. WATERS, OF TULSA, OKLAHOMA, ASSIGNOR TO SMITH SEPARATOR COMPANY, OF TULSA, OKLAHOMA.

SPIRAL BAFFLE.

Application filed September 30, 1925. Serial No. 59,720.

My invention consists in new and useful improvements in oil and gas separators, and relates particularly to gas outlet baffles for separating the outgoing gas from any particles of liquid which may have passed the main separator baffles or scrubbing means.

It is the object of my invention to provide a spiral baffle in the gas outlet pipe which will cause the gas to assume a whirling motion while passing through said pipe, thereby causing any particles of liquid contained in said gas, to be deposited on the walls of the pipe, where they will descend by gravity into a spiral trough and be conveyed to the bottom of the separator tank.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a sectional view of a separator tank showing my improved spiral baffle.

Fig. 2 is a section taken on line 2—2 of Fig. 1, and

Fig. 3 is a detail view of the spiral trough or cup.

In the drawings, 1 designates an oil and gas separator tank of the usual construction provided with an oil and gas inlet 2, and baffles 3, which may be of any type, those shown in Fig. 1 of the drawings, being of similar design to those disclosed in my former Patent No. 1,511,854, dated October 14, 1924.

4 represents a pipe for conveying any oil or other liquid which may have risen with the gas, back to the bottom of the tank, and 5 is the usual oil outlet.

The gas outlet and spiral baffle form the main part of this invention, and consist in an outlet pipe 6, extending within the tank 1, from a point slightly below the top thereof substantially to the lower extremity of the same, where it terminates in an L 6ª which projects through the wall of the tank. As shown in the drawings, the pipe 6 is of two different diameters, but this is not necessary. The pipe may be the same diameter throughout.

Within the pipe 6, starting at the upper extremity, is a spiral baffle 7 of smaller dimension than the inside diameter of the pipe 6, and spaced apart from the walls of said pipe by a plurality of vertically extending rods 8. This baffle 7 is supported by a center rod 7ª, and extends approximately for one-half the length of the pipe 6, and is reduced at its lower end to register with the inside wall of a spiral trough 9, shown in detail in Fig. 3.

The inner wall of the trough 9 is welded to the last turn of the baffle 7 which continues to the end of the trough while the outer wall is welded to the inner wall of the pipe 6. From the edge of the pipe 6 to the center of the spiral baffle, the trough turns at right angles as shown at 10, which protects the outer edge of the entire last turn of the spiral baffle. In the lower outside wall of the trough 9, I provide an aperture 11, which registers with an aperture 12 in the pipe 6, opening into a downwardly extending pipe 13 on the outside of the pipe 6, which terminates in the lower portion of the tank. The pipe 13 is provided with a vertical check valve 14 which may be located at any desirable point therein.

The operation of my device is as follows:

The oil and gas enter as usual through the inlet 2 the greater part of the oil falling to the bottom of the tank and the gas rising to the top. It is obvious, however, that the rising gas will carry with it a quantity of the lighter liquid hydrocarbons the greater portion of which will be separated therefrom by the conical or other baffles 3, which allow the gas to pass to the top of the tank.

The gas is then forced down through the outlet pipe 6 where it is given a whirling motion by the spiral baffle 7. This tends to throw any remaining particles of liquid to the edges of the baffle and on the inner walls of the pipe 6 by centrifugal force from whence said liquids will descend by gravity due to the space between the walls of the pipe and the baffle 7.

The gas will be in such volume that it will continue to follow the spiral baffle all the way down, at each turn, more liquid or solid substance being separated from the gas. When the point where the spiral trough or cup 9 is reached, the liquid runs into said trough which being narrow and deep, the gas will not enter, but due to its whirling motion will continue to follow the baffle down to the end. At this point the trough 9 also ends and turns back at right angles to the center of the spiral baffle and if there is any liquid or solid which has followed the baffle down, it drops into this narrow deep trough at 10, and the gas passes on out through the L 6* in the pipe 6.

The liquid in the trough 9 flows out through the aperture 11 this being the lowest point in the trough, into the pipe 13 and down to the bottom of the tank, where it is drawn off in the usual manner.

The lower end of the pipe 13 is submerged in oil, as a certain depth of oil is maintained in the tank at all times, which provides an oil seal over the end of said pipe.

The check valve 14 will only function if for any reason the oil outlet on the separator does not open and the tank should partially fill up, when the said valve will prevent the oil from backing up in the pipe 13 and trough 9.

From the foregoing it is believed that my invention may be clearly understood without further description, it being borne in mind that numerous changes may be made in the details of construction without departing from the spirit of the invention, as disclosed in the appended claims.

What I claim and desire to secure by Letters Patent is:—

1. An oil and gas separator comprising a tank, an oil and gas inlet in said tank, an oil outlet, a gas outlet conduit, a spiral baffle in said conduit spaced apart from the inner walls thereof, a spiral trough at the lower extremity of said baffle adapted to receive oil particles separated by said baffle, an outlet in said trough connected with a downwardly extending pipe for conveying liquids to the bottom of said tank.

2. An oil and gas separator comprising a tank, an oil and gas inlet in said tank, an oil outlet, a vertically extending gas outlet conduit within said tank, the lower end of which projects through the side wall of said tank, a spiral baffle within said conduit spaced apart from the inner walls thereof by vertically extending rods, a spiral trough having its inner walls secured to the last turn of the spiral baffle and its outer walls secured to the inner walls of the conduit, an outlet in said trough, a connection secured in said outlet and a downwardly extending pipe secured to said connection outside said conduit.

3. An oil and gas separator comprising a tank, an oil and gas inlet in said tank, an oil outlet, a vertically extending gas outlet conduit within said tank open only at its upper extremity, a spiral baffle in said conduit of lesser diameter than the inner diameter of the conduit and spaced apart from the inner walls of said conduit, means at the lower extremity of said baffle for receiving liquid particles separated by said baffle, and means for conveying the same to the bottom of said tank.

In testimony whereof I affix my signature.

MILLARD F. WATERS.